United States Patent [19]

Cheng et al.

[11] Patent Number: 5,432,047
[45] Date of Patent: Jul. 11, 1995

[54] PATTERNING PROCESS FOR BIPOLAR OPTICAL STORAGE MEDIUM

[75] Inventors: John C. Cheng, San Jose; William D. Hinsberg, III, Fremont; Robert T. Lynch, Jr.; Scott A. MacDonald, both of San Jose; Lester A. Pederson, Clovis; James S. Wong, San Jose, all of Calif.

[73] Assignee: International Business Machines Corporation, Armonk, N.Y.

[21] Appl. No.: 897,626

[22] Filed: Jun. 12, 1992

[51] Int. Cl.⁶ .................................................. G11B 7/26
[52] U.S. Cl. .................................... 430/321; 430/320; 430/945
[58] Field of Search ................ 369/277, 279; 430/321, 430/320, 328, 394, 323, 329, 325, 326, 945

[56] References Cited

U.S. PATENT DOCUMENTS

| | | | |
|---|---|---|---|
| 4,363,116 | 12/1982 | Kleuters et al. | 369/30 |
| 4,469,424 | 9/1984 | Matsui et al. | 354/298 |
| 4,732,844 | 3/1988 | Ota et al. | 430/322 |
| 4,767,723 | 8/1988 | Hinsberg et al. | 437/41 |
| 4,839,251 | 6/1989 | Ohta et al. | 430/5 |
| 4,893,298 | 1/1990 | Pasman et al. | 369/275 |
| 4,953,385 | 4/1990 | Aoki et al. | 72/462 |
| 5,045,438 | 9/1991 | Adachi | 430/321 |
| 5,060,223 | 10/1991 | Segawa | 369/275.4 |

FOREIGN PATENT DOCUMENTS

| | | | |
|---|---|---|---|
| 0221514 | 5/1987 | European Pat. Off. | |
| 0220578 | 6/1987 | European Pat. Off. | |
| 2321164 | 4/1977 | France | 369/279 |
| 3337315 | 4/1984 | Germany | |
| 58-95149 | 6/1983 | Japan | |
| 1116636 | 5/1989 | Japan | |
| 249230 | 2/1990 | Japan | |
| 249231 | 2/1990 | Japan | |
| 2-245319 | 10/1990 | Japan | 430/321 |

OTHER PUBLICATIONS

Horigome, et al., "Novel Stamper Process for Optical Disc," SPIE vol. 889, Optical Storage Technology and Applications (1988), pp. 123–128.

Hinsberg, et al., "A Lithographic Anaglog of Color Photography: Self-Aligning Photolithography using a Resist with Wavelength-Dependent Tone,:" IBM Optical Media, RJ6750 (64597) Mar. 29, 1989, Chemistry.

Primary Examiner—Charles L. Bowers, Jr.
Assistant Examiner—John A. McPherson
Attorney, Agent, or Firm—Douglas R. Millett; Paik Saber

[57] ABSTRACT

An optical data storage device having a substrate has guide ridges, or reverse grooves, in a concentric or spiral shape formed thereon, and disposed in a plane parallel to and disposed from the substrate surface. The device further has pits formed approximately midway between the guide ridges and disposed in the substrate and having bottoms below the plane of the substrate surface. A method for manufacturing the optical data storage device having both address pits and guide ridges is disclosed. A dual tone photosensitive material is applied to a substrate, exposed with a laser light source comprising two distinct wavelengths, and developed to provide a desired bipolar geometry thereon.

4 Claims, 8 Drawing Sheets

PATTERNING PROCESS FOR BIPOLAR OPTICAL STORAGE MEDIUM

FIELD OF INVENTION

This invention relates to optical data storage devices and in particular to optical data storage devices having integrally formed read only data.

More particularly, this invention relates to a process of making optical storage media or stamper masters for replication of optical storage media, each having data encoded thereon in the form of a bipolar pattern.

BACKGROUND OF THE INVENTION

High density optical storage, direct access storage devices, are usually circular in shape, with concentric circular, or alternatively spiral, data "tracks" along which data is recorded. In typical optical storage devices, grooves provide the physical identification of, and separation between, adjacent optical device tracks.

The data tracks of typical storage devices consist of "sectors" each having an address part, or "headers", and an information part. The headers are addressable units which serve to identify the relative locations of information within a particular track.

In optical storage devices, tracks may be distinguished by "grooves" and headers may be identified by discrete "pits", each preformed during the manufacturing process on the surface of the optical device substrate. Such an optical storage device offers a "preformatted" structure. That is, a structure having a plurality of grooves and pits that provide tracking and addressing information respectively.

Alternatively, the preformed device pits may comprise both header and digital data contents (actual information recorded within each sector) on the surface of the optical device substrate as is typical for conventional permanent read only or pre-recorded disks. Thus defining a "read only" optical storage device as consisting of the preformed structure offering a plurality of grooves and pits that provide tracking and addressing information as well as digital data contents itself.

The prior art consists of dual depth optical storage devices as optical devices in which the optical device substrate contains both grooves and pits, each disposed on planes parallel to, and in the same direction from, the substrate surface. In one embodiment, the device grooves and pits are integrally formed within the device substrate and downwardly disposed from the plane of the substrate. In an alternate embodiment, the device grooves and pits are integrally formed upon the device substrate and upwardly disposed from the plane of the substrate. In the alternate embodiment the track portions of the optical storage device are separated by reverse grooves, or "ridges", the peaks of which are disposed substantially above radially adjacent data track sections of the optical storage device; and the header portions (and digital information within the sectors in a read only device) comprise reverse pits, or "hills". The device grooves are shallower than the device grooves in the first prior art dual depth structure, and the device ridges are shorter than the device hills in the alternate prior art dual depth structure.

During normal operation, optical storage device grooves facilitate detecting and correcting radial positioning of the read/write head within the storage subsystem. Typically, the radial position is maintained or corrected by means of the "push-pull" or differential method as disclosed in, for example, U.S. Pat. No. 4,363,116. In that method, the optical device is exposed to a radiation "read" beam that is reflected into a zero-order, first-order and higher-order subbeams. The angular difference between the zero-order subbeam and the first-order subbeam being defined as the "phase depth".

The push-pull method utilizes two detectors which receive different orders of the reflected read beam. The difference between the output signals of the two detectors provides information as to the radial orientation of the read beam with respect to a device track (as indicated by a groove or ridge). If the output signals differ, the read beam does not coincide with the central axis of the track, and the difference fed to a servo system acts to correct the read beam orientation.

The prior art illustrates that the push-pull, or difference signal, varies as a function of the relative depth (height) of grooves and pits (ridges and hills) in a dual depth device with the relative depth (height) defining a phase depth. Further, the push-pull signal varies as a function of the relative degree of "flatness" of the "bottom" of pits and grooves (or the "tops" of hills and ridges in the alternate embodiment). Ideally, relatively "flat" pit and groove bottoms (or hill and ridge tops), along with a structure of proper phase depth, result in a sufficiently accurate push-pull signal with constant envelope. That is, a signal having zero amplitude at the central axes of each groove (or ridge) in the optical storage device and maximum amplitude when approximately halfway atop the groove or ridge.

In the manufacture of a dual depth device, a substrate is first coated with a light sensitive photoresist. A light source is selectively attenuated, or otherwise varied in intensity, to provide a desired exposure pattern on the photoresist. The photoresist is then developed to form the desired pattern of grooves and pits. The intensity of exposure determines the resulting relative depth of the device grooves and pits. The resulting device may be used as the optical device itself or serve as a stamper master for replication of the optical device.

The above-described method for dual depth manufacture ideally would result in grooves and pits (ridges and hills) of well controlled relative depths (heights) and flat bottoms (tops). However, the light source attenuation may be imprecise; the light source used to expose the photoresist is Gaussian in distribution and unavoidably decreases in intensity radially from the light source center; and the subsequent development process is narrow. Thus, the resulting groove and pit (ridge and hill) geometry and contour, of the dual depth optical structure, may lack desirable relative depths (heights) and actually have rounded bottoms (tops). The resulting geometry and contour may also adversely affect the push pull signal and lead to erroneous tracking information.

An improvement to the above process is illustrated in U.S. Pat. No. 5,060,223 ('223) to Segawa. '223 defines pits as a function of the wavelength of an incident read beam and refractive index of the device substrate, as well as defining the pitch of device grooves. Another improvement to the above process is illustrated in U.S. Pat. No. 4,469,424 ('424) to Matsui, et al. wherein a monitoring beam is utilized during the development process to more accurately control the depths and widths of grooves and pits to within a predetermined allowable range. Yet another improvement to the above process is illustrated in U.S. Pat. No. 4,732,844 ('844) to Ota et al. wherein two layers of photoresist, separated by an intermediate layer, are exposed and independently removed. The resulting dual depth device offers grooves and pits having more accurately controlled depths and widths. U.S. Pat. No. 4,893,298 ('298) to Pasman, et al. provides still another example of an improvement to the above embodiments wherein track width is defined as a function of the track period. Further, '298 discloses an, embodiment of tracking grooves and data pits, or an alternative embodiment of "ridges" and "hills". Notwithstanding the attempts in the prior art to control the relative depths (heights) and contour of the dual depth optical storage device structure, the resultant device is bound to the practical limitations of the dual depth structure itself. Namely, on the one hand there is the need to reduce the physical size of optical storage devices, while on the other hand compactness is limited to the dual depth optical storage device embodiment.

A practical consequence of dual depth optical device structures having non-ideal optical storage device geometries and contours, results in signal envelopes with varying amplitudes. In a severe case, the amplitude of a tracking error signal may be reduced to below minimum recognizable levels, so that it is impossible to normally perform tracking control.

The prior art illustrates that there are several shortcomings of the dual depth structure described above. Namely, the use of underexposed photoresist results in narrow process and development windows resulting in undesirable groove and pit geometries. The conventional process of manufacture is one wherein the development step is the same for device grooves and pits. As such, a means for control of the pit and groove features is largely dependent on precise control of the exposure step. In order to ensure desired tracking and accessing performance with the conventional manufacturing process, the yield tends to be low. Further, the process is not applicable to glass substrates. Glass substrates offer superior optical and mechanical properties for high performance storage applications.

The processes of dual depth device manufacture and improvements are not suited to optical storage devices comprising both pits and "reverse" grooves, or ridges, because of the limited ability to control two independent features in single developing and etching steps. Prior art methods of manufacture that offer dual depth device embodiments exclusively with either pits and grooves, or ridges and hills. We define bipolar geometries as devices having both pits and ridges, each disposed on planes parallel to, and in opposite directions from, the substrate surface.

EP 0220578 discloses and claims a bipolar patterning process. The disclosed method is based on the use of a process of manufacture for self aligned semiconductor structures having bipolar patterns. The process of manufacture of self aligned bipolar semiconductor devices has been ignored in optical storage device manufacture. In semiconductor devices, a bipolar pattern is used to take advantage of diverse electrical properties associated with heterogeneous layers of semiconductor substrates. No such requirement pertains to optical storage devices. Further, while the process in EP 0220578 works for large lithographic geometries, it is impractical for small geometries required for high performance optical storage devices. That is, while the photoresist as described in EP 0220578 is capable of sub-micron resolution, the optical mask system described in EP 0220578 is not. In addition, reasonable improvements to that optical system (such as improving lens performance by increasing numerical aperture) still will not enable the system to print geometries required for optical storage devices.

As previously noted, attempts have been made to improve known manufacturing processes to yield more desirable groove and pit geometries but cost effective solutions have to date largely eluded researchers.

OBJECTS OF THE INVENTION

In view of the foregoing, it is therefore an object of the invention to provide an optical disk storage device which overcomes the performance and reliability deficiencies of dual depth optical disk storage devices.

Another object of the invention is to provide a method of manufacturing an optical storage device which allows manufacture smaller optical storage devices and overcomes physical limitations of dual depth optical storage devices.

Still another object of the invention to provide a process of forming precisely controlled pit and groove features on an optical storage device substrate to permit improved tracking and accessing within the optical storage device.

SUMMARY OF THE INVENTION

The objects of the present invention are accomplished by using a glass substrate coated with a dual tone photoresist that is selectively exposed to a laser source of essentially two discrete wavelengths. The exposed surface is initially developed and etched to provide a pattern in the glass substrate resulting from the image projected by the first wavelength of the laser source. The substrate is then flood exposed, developed and etched to provide a relief pattern in the glass substrate resulting from the image projected by the second wavelength of the laser source.

This process produces a bipolar device having pits and ridges having "flat" pit bottoms and ridge surfaces. The improved geometry of pits and ridges along with improved control of the phase depth, result in push-pull and read signals with unexpected characteristics, namely, the signal is similar to that in an optimal dual depth device, differing essentially in sign. Further, the inherent structure of the bipolar optical storage device with its resultant phase depth is such that it allows for smaller, more compact, optical storage device embodiments.

DETAILED DESCRIPTION OF THE INVENTION

Figure 1:
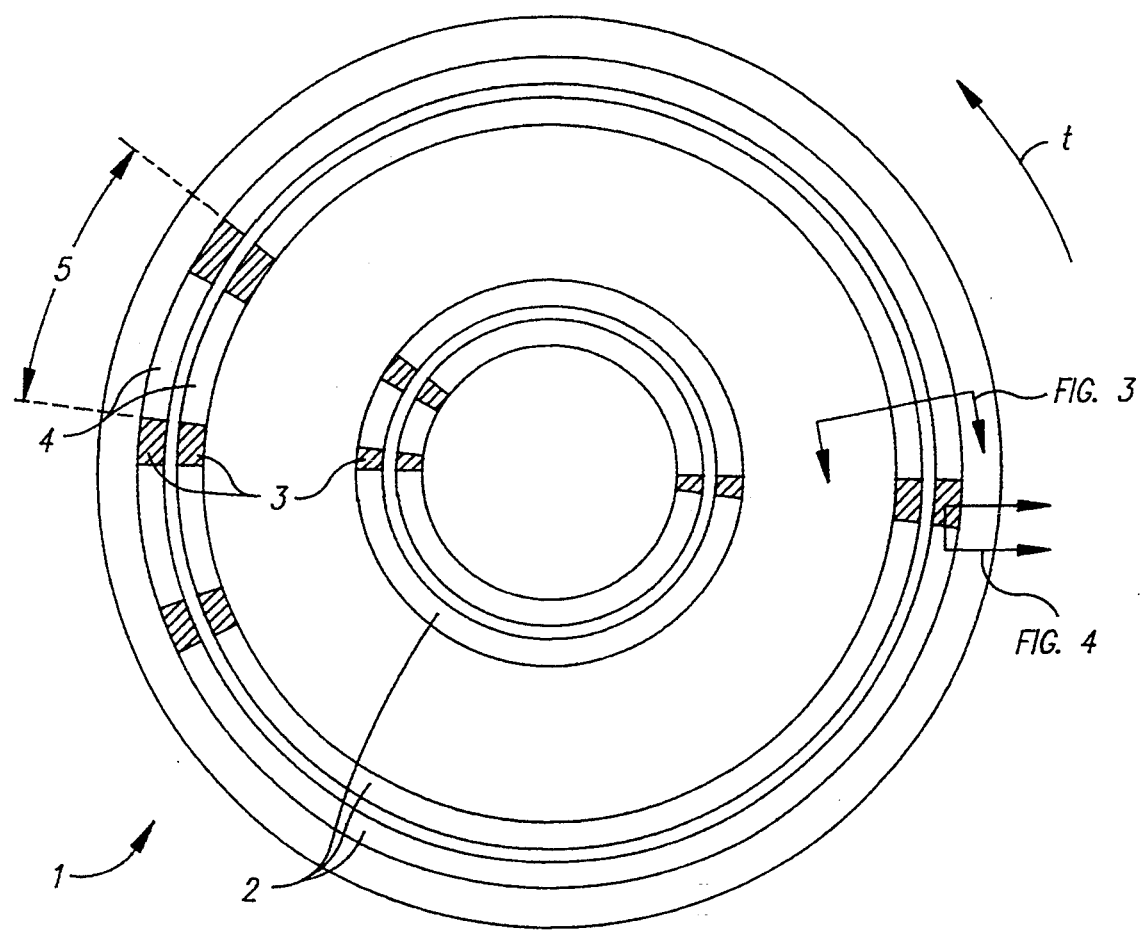
FIG. 1 is a plan view of a prior art optical disk.

FIG. 1 illustrates a prior art optical storage device 1 having, for example, a plurality of concentric tracks 2, a few of which are shown. Each track 2 is divided into a plurality of sectors 5. Each sector comprises a data containing track portion 4, along which a user can record information or read-only information may be integrally formed during the manufacturing process. Each sector further comprises a read-only header portion 3, which serves to identify the relative position of recorded data. An alternative embodiment (not illustrated) utilizes a spiral track which is divided into a plurality of sectors.

Figure 2:
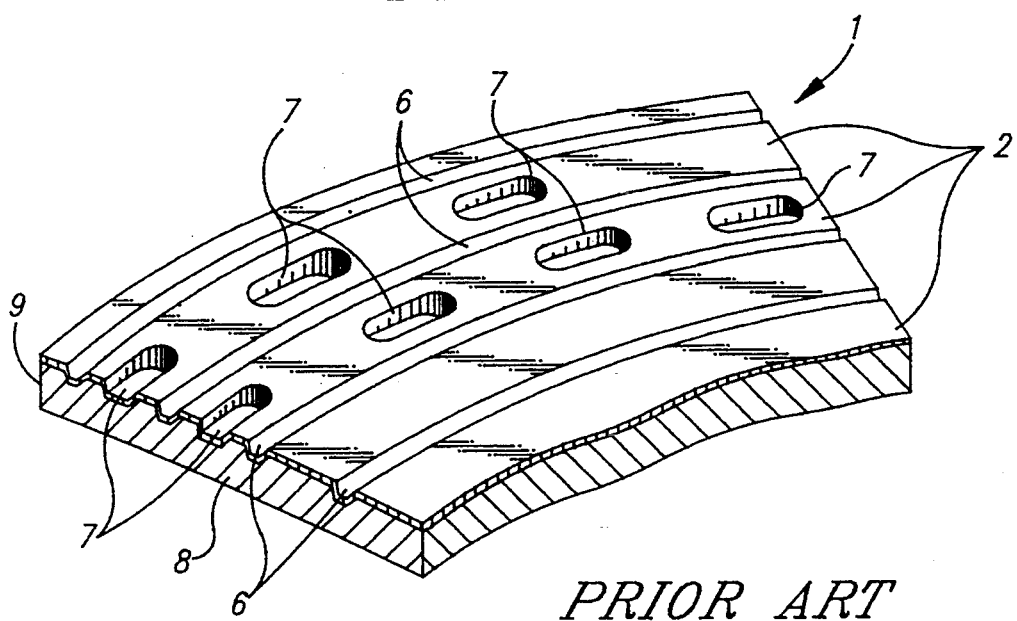
FIG. 2 is a perspective view showing a cross sectional cut out of the prior art optical disk shown in FIG. 1, for a dual depth optical device.

FIG. 2 illustrates radially adjacent tracks 2 of the prior art optical storage device from FIG. 1. Between successive concentric tracks 2, or successive turns of a spiral track, grooves 6 are formed in the surface of the substrate 8 and serve to differentiate between any radially adjacent tracks. A film 9 may optionally be provided on the surface of the device substrate 8. Further, pits 7 are integrally formed, approximately midway between adjacent device grooves 6, and disposed within the same direction as the device grooves 6. That is, the device tracks 2, and the substrate 9 surface in general, define a plane. The device grooves 6 and pits 7 are each downwardly disposed in a direction normal to the defined plane. In an alternate embodiment, device pits and grooves are each disposed above the surface of the device track 2 (not shown). In either embodiment the relative depth (height) of the device grooves 6 are shallower (shorter) than that of the device pits 7. The above described features thereby defining a dual depth optical storage device.

Figure 3A:
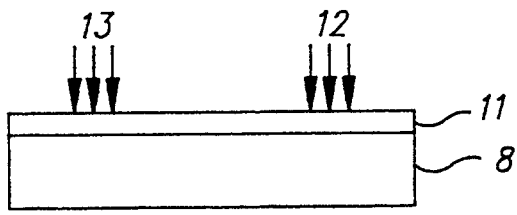
FIG. 3 shows successive stages in the prior art process of manufacturing the dual depth optical storage device according to the conventional process using underexposed photoresist.
Figure 3B:
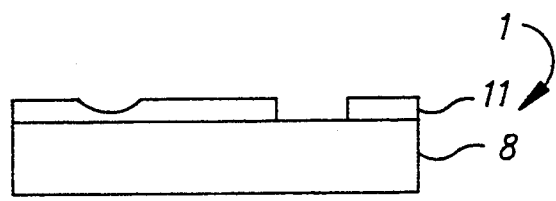
Figure 3C:
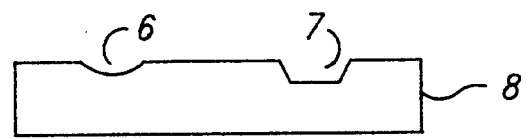

FIG. 3(a)-(b) shows the result of a prior art process for manufacturing an optical storage device or stamper master with the dual depth feature. That is, an optical disk or stamper master 1 having pits 7 and shallower grooves 6 each downwardly disposed within the device substrate 8. In the dual depth process, a substrate 8 is first covered with a photoresist layer 11. The photoresist layer 11 is irradiated with a light source that is selectively masked and attenuated. The masking and attenuation results in a latent pattern on the substrate that varies from fully exposed photoresist at 12, underexposed photoresist at 13, to unexposed photoresist. The photoresist 11 is then developed. The remaining structure is the stamper master (FIG. 3(b)). A stamper is typically fabricated by first vacuum-depositing a thin nickel layer atop this stamper master, then electroforming in a nickel bath a much thicker layer. The resultant nickel stamper is peeled from the stamper master, cleaned and trimmed. After mounting the stamper in a mold, injection molding techniques ale used to produce plastic substrates (FIG. 3(c)) whose features replicate those of the original stamper master (FIG. 3(b)). As a result of the above described prior art process, data pits 7 are formed at areas where the photoresist 11 is fully exposed at 12, and shallower grooves 6 are formed at areas where the photoresist 11 is underexposed at 13.

Figure 4:
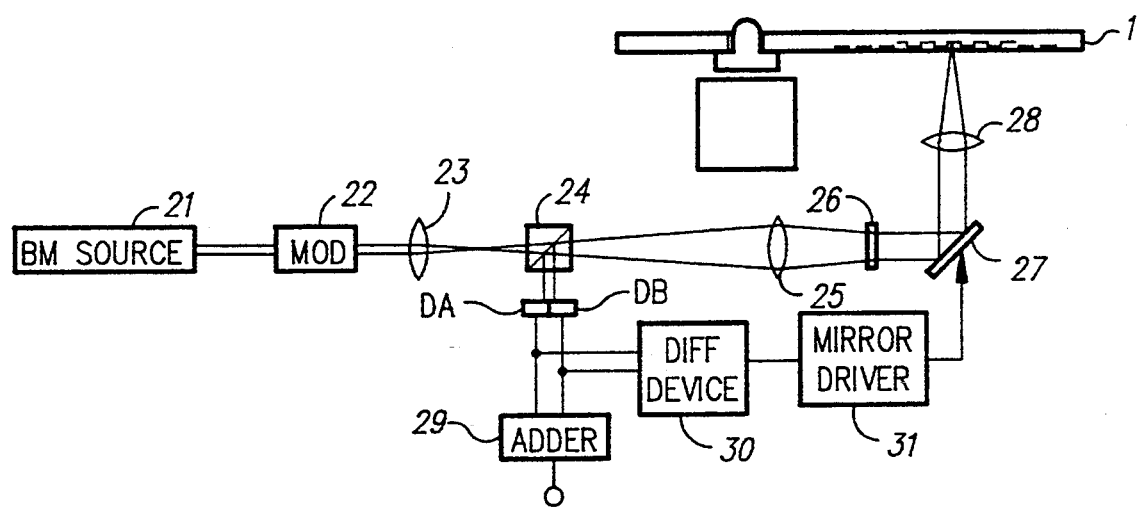
FIG. 4 is illustrates a prior art recording-reproducing apparatus for an optical disk.

FIG. 4 shows an example of a prior art recording-reproducing apparatus. In this apparatus, a laser beam is outputted from laser beam source 21 such as a helium-neon laser or a diode laser. The laser beam is then irradiated onto optical disk 1 through modulator 22, lens 23, deflecting beam splitter 24, lens 25, ¼ wavelength plate 26 rotary mirror 27 and objective lens 28. Then, the reflected light from the optical disk 1 is read by a photoelectric converting element.

Figure 5:
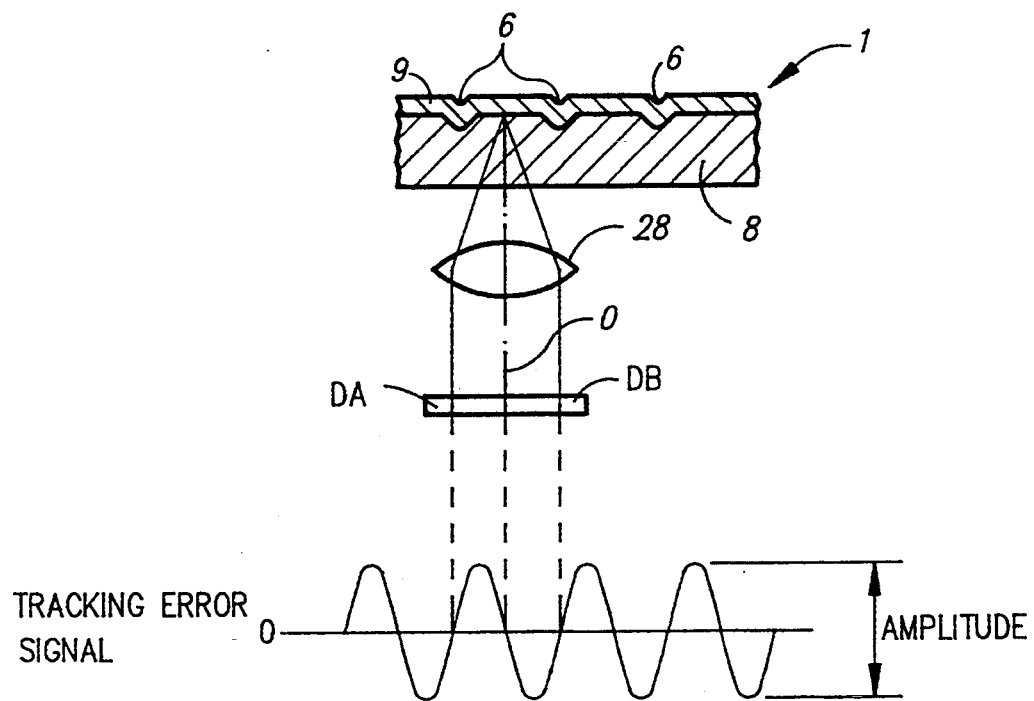
FIG. 5 is a cross-sectional view for explaining general tracking error signal characteristics in a prior art dual depth optical disk device.

As shown in FIG. 4, the tracking control of the laser beam is performed by a tracking controller comprising two divided photodiodes DA, DB, adder 29, differential device 30 and rotary mirror driver 31. As shown in FIG. 5, when optical axis 0 of the laser beam is located in the center of each guide groove pair 6 of optical disk 1, i.e. accurate tracking state, the laser beam reflected from optical disk 1 delivers equal amounts of light to two divided photodiodes DA and DB. Therefore, outputs A and B of photodiodes DA and DB are equal to each other so that output (A-B) of differential device 30 becomes zero. However, in FIG. 5, when optical axis 0 of the laser beam is shifted in the right and left directions, i.e., in a shifted tracking state, outputs A and B of photodiodes DA and DB are not equal to each other so that output (A-B) of differential device 30 is not zero. In this case, a tracking error signal is provided to rotary mirror driver 31 to rotate rotary mirror 27. The tracking servo control is performed with respect to this rotary mirror 27 until outputs A and B of two divided photodiodes DA and DB are equal to each other, i.e., no tracking error signal is generated by the shift of optical axis 0 by the rotation of rotary mirror 27.

The function of the above described tracking servo control is influenced by the magnitude of the tracking error signal. Namely, the servo function is improved as the magnitude in amplitude of the tracking error signal, shown in FIG. 5, is large. In a portion of optical disk 1 containing pre-format pits 7, the amplitude of this tracking error signal tends to be small in comparison with data section 4. This means that the amplitude of the tracking error signal can be changed by the cross sectional shapes of guide grooves 6 and pre-format pits 7.

Although not previously anticipated, the mechanics of the tracking error signal in FIG. 5 are valid in optical storage device embodiments comprising grooves and reverse pits, or data "hills" (as well as reverse grooves, or "ridges" and pits) However, methods heretofore of manufacture along with the unanticipated tracking error signal characteristics have excluded bipolar optical storage devices as a feasible storage medium. Here, we define bipolar optical storage devices as optical devices in which the substrate contains both pits and ridges, each disposed on planes parallel to, and in opposite directions from, the substrate surface.

Figure 6:
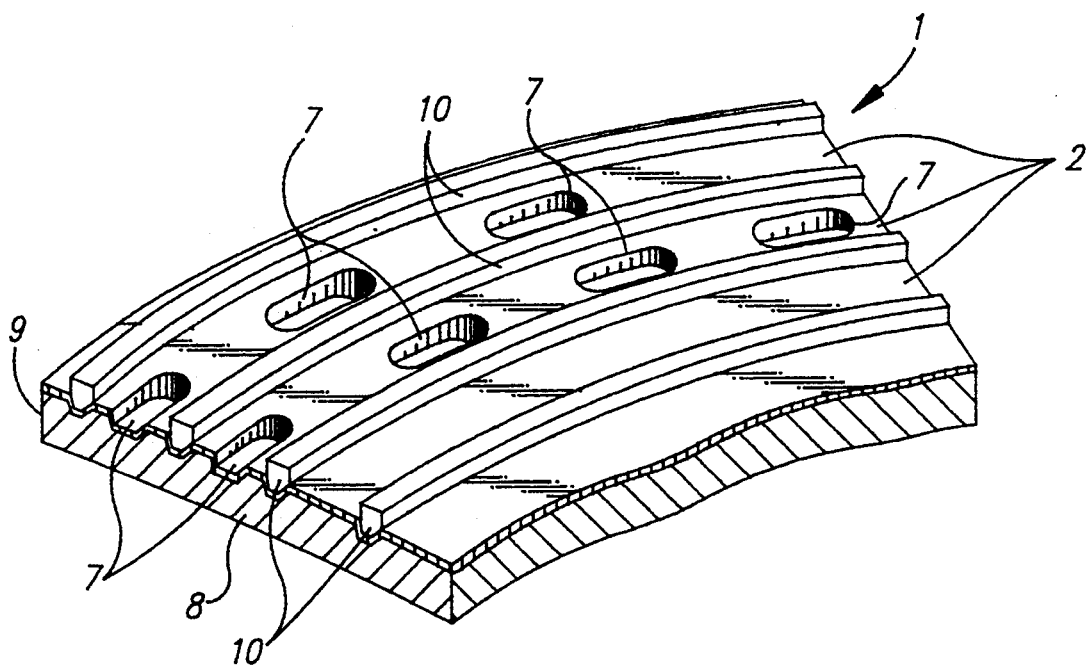
FIG. 6 is a perspective view showing a cross sectional cut out of the optical disk shown in FIG. 1, for a bipolar optical device.

FIG. 6 illustrates the preferred embodiment of the optical storage device of the present invention. The optical storage device of FIG. 6 is similar to that of the embodiment in FIG. 2 with the exception that the device tracking grooves 6 of FIG. 2 comprise "reverse" grooves, or ridges 10, the peaks of which are disposed substantially above radially adjacent surfaces of the optical storage device. In the preferred embodiment, the substrate 8 also carries a thin recording layer 9. An ablative write once film, containing for example bismuth or tellurium as its principal element, comprises the recording layer 9 for a write once embodiment of the optical disk device. A magneto-optic film, containing for example terbium iron cobalt as its principal element, comprises the recording layer 9 for a rewritable embodiment of the optical disk device.

Figure 7:
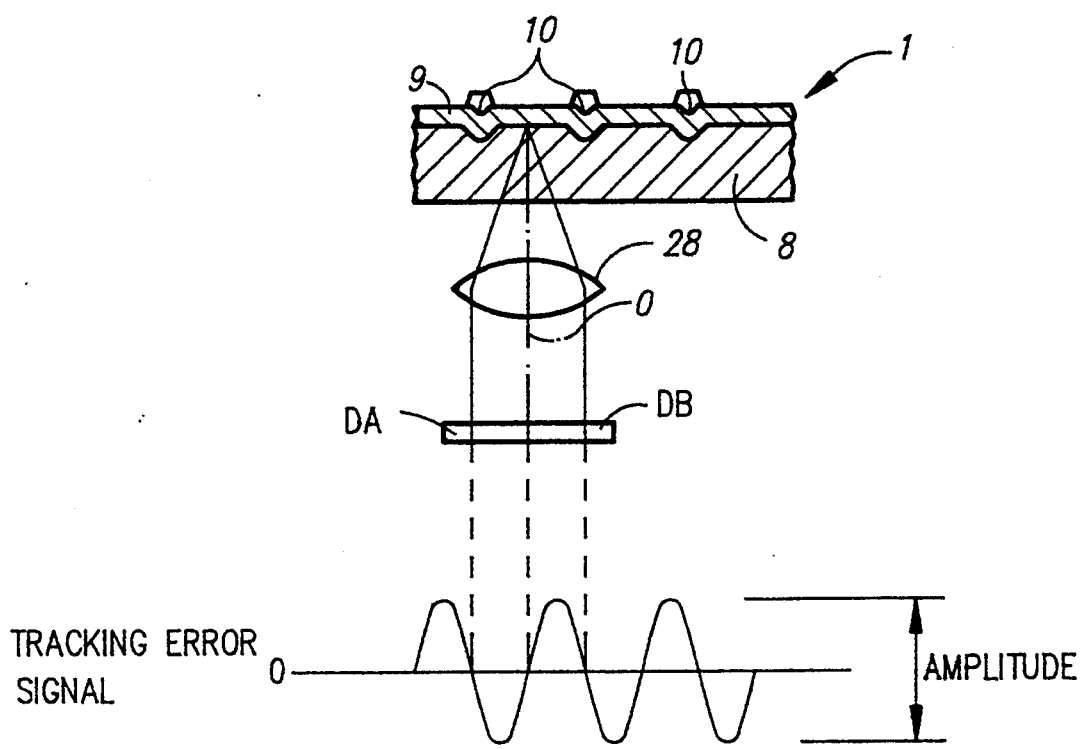
FIG. 7 is a cross-sectional view for explaining general tracking error signal characteristics in a bipolar optical disk device.

A read beam incident upon the bipolar optical disk device of FIG. 6 yields a tracking error signal that is illustrated in FIG. 7. In the preferred embodiment, the incident read beam comprises a laser light source having a wavelength of 670 nm. Referring to FIG. 7, when optical axis 0 of the laser beam is located in the center of each reverse groove pair 10 of optical disk 1, i.e. accurate tracking state, the laser beam reflected from optical disk 1 delivers equal amounts of light to two divided photodiodes DA and DB in FIG. 4. The outputs A and B of photodiodes DA and DB are equal to each other so that output (A-B) of differential device 30 becomes zero. However, in FIG. 7, when optical axis 0 of the laser beam is shifted in the right and left directions, i.e. in a shifted tracking state, outputs A and B of photodiodes DA and DB are not equal to each other so that output (A-B) of differential device 30 is not zero. The resultant tracking error signal in FIG. 7 differs essentially in sign from the tracking error signal of the dual depth structure in FIG. 5. As in the case of the dual depth structure, the portion of the disk 1 containing pre-format pits 7 can have a tracking error signal with a small amplitude.

The bipolar patterning process for optical storage media according to the invention will now be described. This approach is based mainly on the use of a process of manufacture for self aligned semiconductor structures having bipolar patterns as disclosed, for example, in EP 0220578. The process of manufacture of self aligned bipolar semiconductor devices has largely been ignored in optical storage device manufacture. In semiconductor devices, a bipolar pattern is used to take advantage of diverse electrical properties associated with heterogeneous layers of semiconductor substrates. No such requirement pertains to optical storage devices. Further, while the process of manufacture for semiconductor structures works for large lithographic geometries, it is impractical for small geometries required for high performance optical storage devices. While the photoresist as used in prior art bipolar semiconductor devices is capable of sub-micron resolution, the optical mask system for the semiconductor devices is not. In addition, reasonable improvements to the prior art optical system (such as improving lens performance by increasing numerical aperture) still will not enable the system to print geometries required for optical storage devices.

Figure 8A:
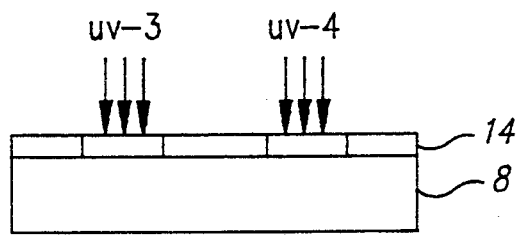
FIG. 8 shows successive stages in the process of manufacturing the bipolar optical storage device with a dual tone photoresist.

Referring to FIG. 8(a), a dual tone photoresist 14 is applied to the optical disc substrate 8 by a known method, e.g. spin coating. The photoresist composition comprises a matrix resin and two photoactive additives, a positive tone which causes acceleration of dissolution upon exposure to a radiation source of a first wavelength and a negative tone of which causes deceleration upon exposure to a radiation source of a second wavelength. The dual tone photoresist composition, exposure of the photoresist, and development are according to the method described, for example, in an article: "A Lithographic Analog of Color Photography: Self-aligning Photolithography using a Resist with Wavelength-Dependent Tone" by Hinsburg, MacDonald, Pederson, and Willson. The preferred embodiment calling for a photoresist composition comprising a diazoketone/phenolic resin positive resist and an azide/phenolic resin negative resist—in a single composition.

Figure 9:
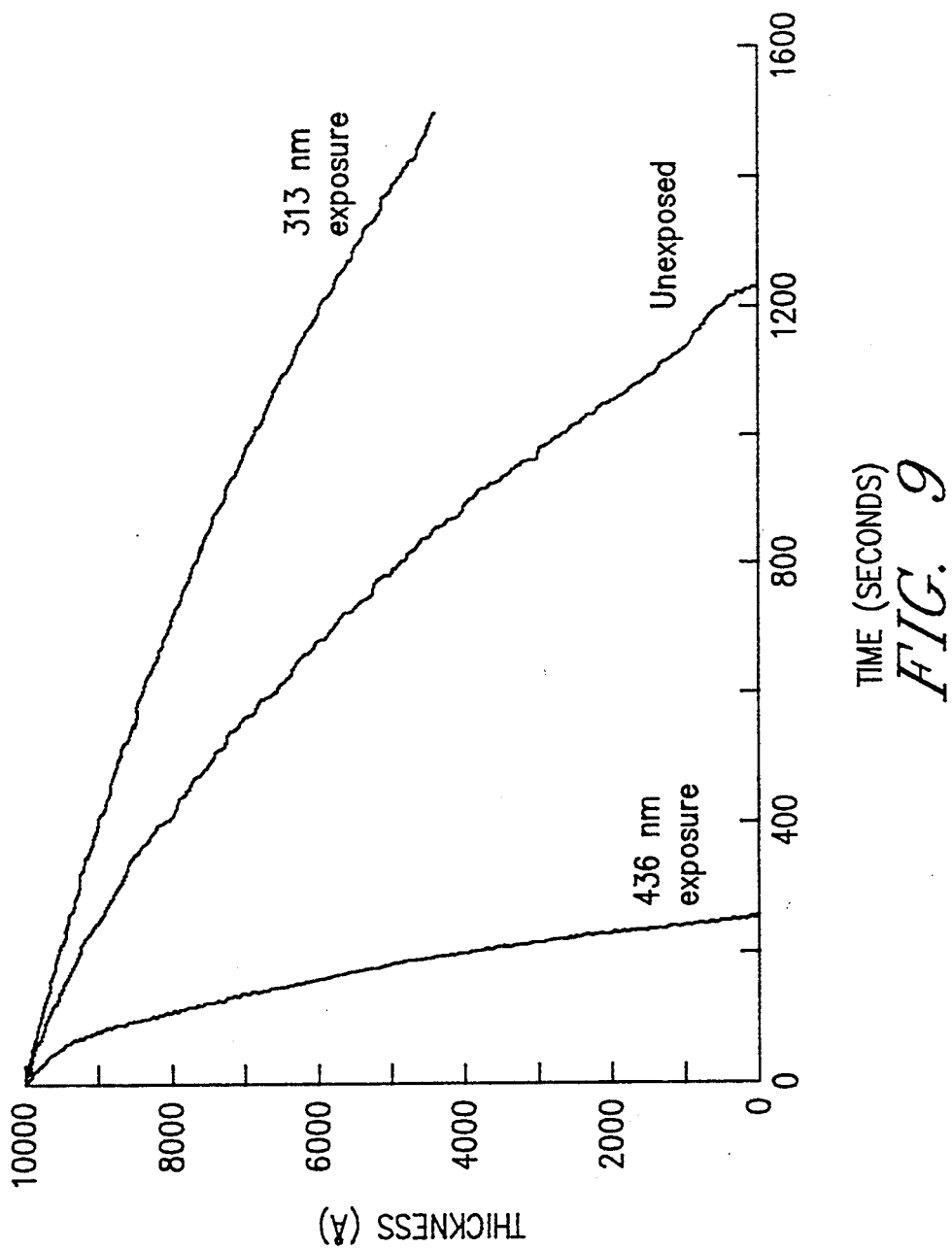
FIG. 9 shows the dissolution kinetics of the dual tone photoresist exposed with near-UV light, mid-UV light, and unexposed areas.

The great majority of photoresists are intrinsically imageable in only one tone. FIG. 9 displays plots of film thickness versus time in aqueous alkaline developer for films of the dual tone photoresist in the unexposed state, and after monochromatic exposure to doses of near-UV or mid-UV light. The solubility rate differences provide a means of differentiating latent images formed by near-UV exposure, mid-UV exposure and from unexposed photoresist.

Figure 10:
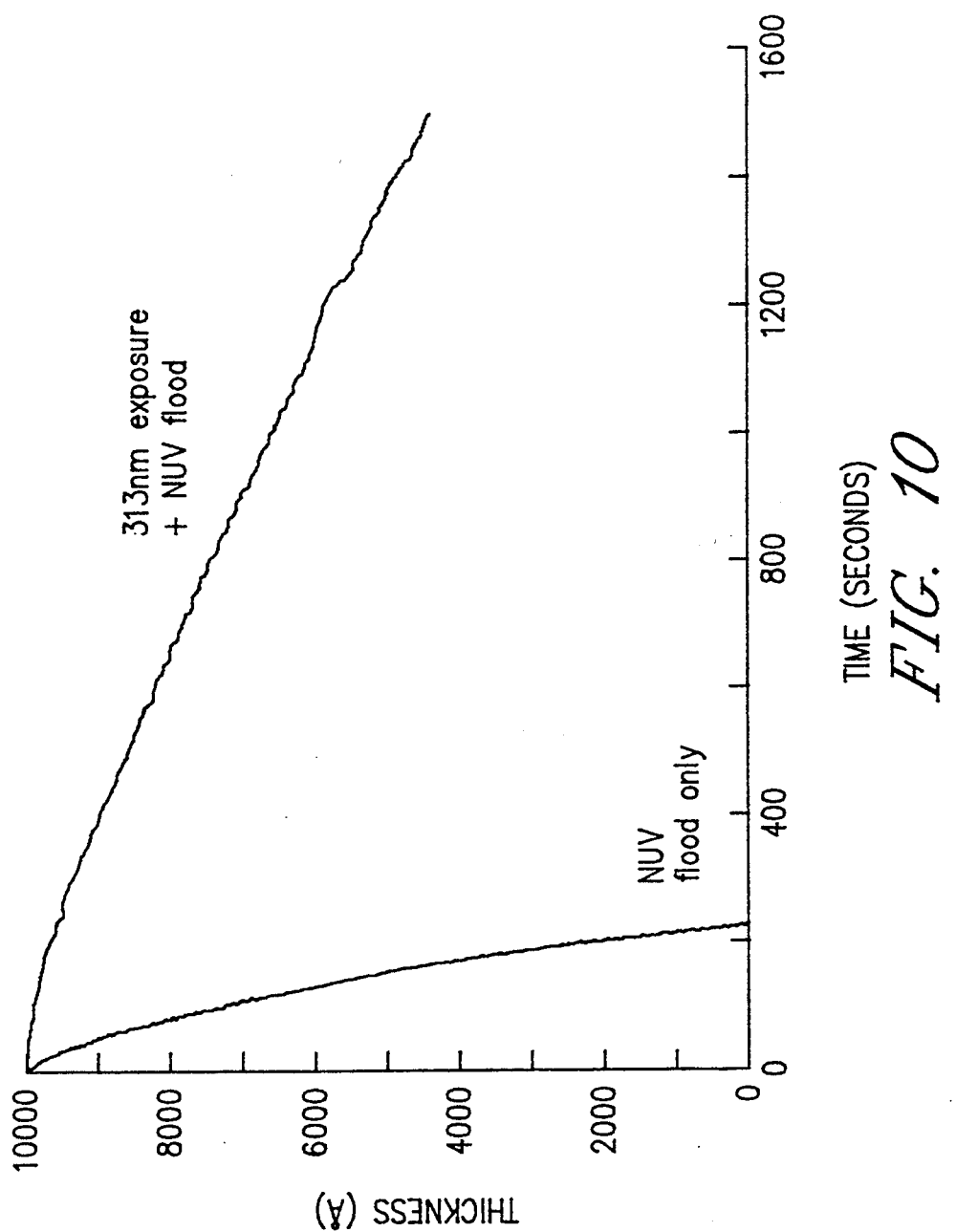
FIG. 10 shows the dissolution kinetics of the dual tone photoresist with areas exposed with near-UV light and areas exposed with near-UV and mid-UV light.

FIG. 10 shows the dissolution behavior of two films of the dual tone photoresist which have been irradiated with a dose of near-UV light sufficient to decompose all the diazonaphthoquinone and developed in an aqueous base.

Figure 11:
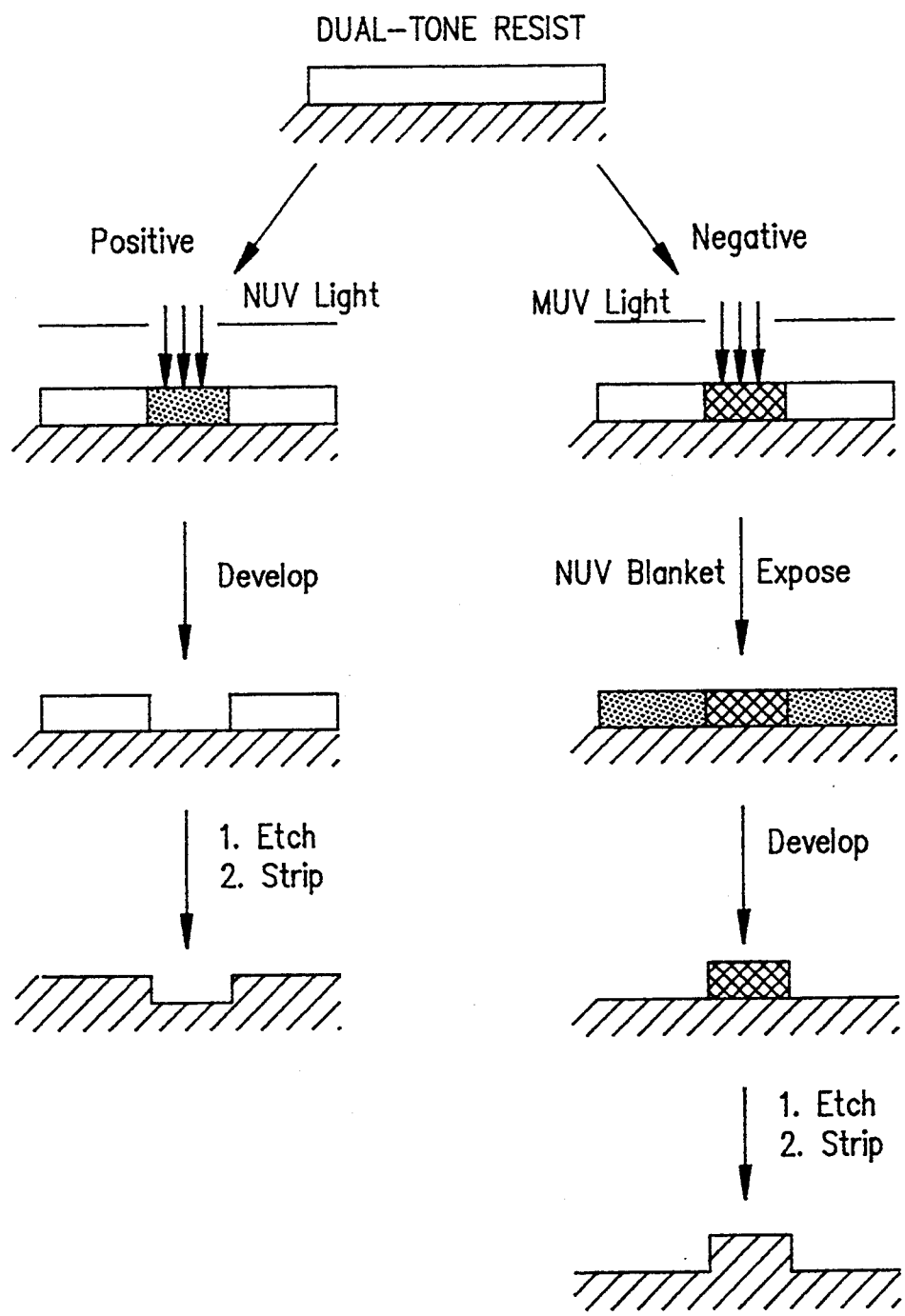
FIG. 11 shows a schematic representation of positive and negative tone lithographic processes using the dual tone photoresist.

The process sequences for negative tone and for positive tone imaging of the dual tone photoresist are summarized in FIG. 11. By combining both positive and negative processes, implementing the exposure in a parallel fashion, and carrying out development sequentially, a bipolar optical storage device with precisely controlled ridges and pits results.

As illustrated in FIG. 8(a), a radiation source is used to expose the photoresist. In the preferred embodiment, the light source comprises one master writer with two laser light sources at a first wavelength and a second wavelength, UV-4 and UV-3. A master writer comprising two separate lasers is illustrated, for example, in hereinbefore cited U.S. Pat. No. 4,893,298. The first wavelength UV-4, 340–440 nm, provides a bandwidth necessary to expose the photoactive additive to cause an accelerated dissolution of the positive tone of the dual tone photoresist 14. Similarly, a second wavelength UV-3, 285–315 nm, provides a bandwidth necessary to expose the photoactive additive to cause a decelerated dissolution of the negative tone of the dual tone photoresist 14. Alternatively, the dual tone photoresist may be exposed by rotating the optical storage device relative to the radiation source and intermittently exposing the dual tone photoresist for variable periods. The laser source UV-4 serves for recording the sector address pits 7 and UV-3 for recording tracking ridges 10.

Figure 8B:
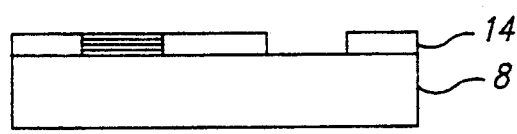
Figure 8C:
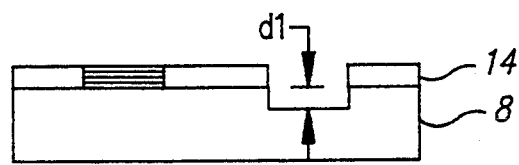

Referring now to FIG. 8(b), the positive tone of the photoresist 14 is initially developed to allow removal at the areas exposed to light of the first wavelength, UV-4. The substrate 8 is immersed in an aqueous alkaline developer during this step and the dissolution kinetics represented by the three curves in FIG. 9 apply. Thus, only those regions exposed with UV-4 light dissolve. The initially developed photoresist 14 provides a first image to the underlying substrate. This first image is then transferred to the underlying substrate and etched to a depth d1, as illustrated in FIG. 8(c), using a conventional method such as reactive ion etching (RIE), standard aqueous etching or sputter etching. The depth d1 is further defined as approximately ¼ wavelength of the incident read beam.

Figure 8D:

At the next step and as shown in FIG. 8(d), the structure is flood exposed with a radiation of a bandwidth that activates only the positive tone of the remaining photoresist 14. The remaining photoresist 14 is subjected to a development step similar to the first, wherein the dissolution kinetics of FIG. 10 apply, so relief image generated by this development step corresponds to those regions patterned with mid-UV light.

Figure 8E:
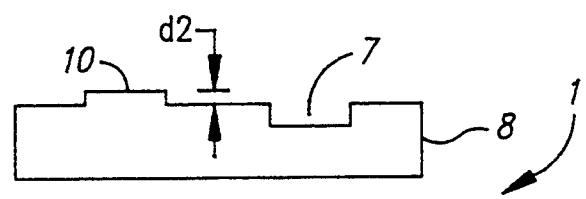

Referring to FIG. 8(e), the developed photoresist provides a second image to the underlying substrate which is likewise developed to generate a corresponding relief image and etched to a depth d2. Inasmuch as the etching applies to the entire substrate surface, the entire substrate, including the previously etched pit 7 are etched. The depth d2 is further defined as approximately ⅛ wavelength of the incident read beam. The rate of etching is however constant, therefore the relative pit depth d1 is maintained. After a final stripping step, the substrate is left with two distinct patterns, one of pits 7 of depth d1 and one of opposing ridges 10 of height d2. The substrate is the ready for deposition of the active rewritable or write-once recording layer and/or a reflective or protective sealing layers.

While the invention has been described above in connection with a preferred embodiment therefore as illustrated by the drawings, those of skill in the art will readily recognize alternative embodiments of the invention can be easily produced which do not depart from the spirit and scope of the invention as defined in the following claims.

We claim:

1. A process for producing a bipolar optical storage device comprising the steps of:

(a) coating a glass substrate with a dual tone photoresist having a positive tone and a negative tone;
    (b) exposing said photoresist to a direct light radiation at a first and a second wavelength from a source having a first and second wavelength;
    (c) developing the positive tone of said photoresist to create a first image formed by the first wavelength of said radiation source;
    (d) etching said glass substrate at areas defined by said first image;
    (e) flood exposing said dual tone photoresist to radiation at said first wavelength;
    (f) developing the negative tone of said photoresist to create a second image formed by the second wavelength of said radiation sources;
    (g) etching said glass substrate at areas defined by said second image; and
    (h) stripping remaining photoresist.

2. The process as in claim 1 wherein, said direct light radiation source comprises two laser radiation sources.

3. The process as in claim 1 wherein, the step (b) comprises rotating the optical storage device relative to said direct light radiation source and intermittently exposing the photoresist for variable periods.

4. The process as in claim 1 wherein, said first wavelength is substantially in the range of about 340–440 nm, and said second wavelength is substantially in the range of about 285–315 nm.

* * * * *